(12) United States Patent
Himeno et al.

(10) Patent No.: US 9,031,688 B2
(45) Date of Patent: May 12, 2015

(54) NESTING DATA GENERATION DEVICE AND NESTING DATA GENERATION METHOD

(75) Inventors: Tatsunori Himeno, Kanagawa (JP); Kazuhisa Nogi, Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 520 days.

(21) Appl. No.: 13/381,401

(22) PCT Filed: Jul. 2, 2010

(86) PCT No.: PCT/JP2010/061321
§ 371 (c)(1),
(2), (4) Date: Dec. 29, 2011

(87) PCT Pub. No.: WO2011/004767
PCT Pub. Date: Jan. 13, 2011

(65) Prior Publication Data
US 2012/0109352 A1    May 3, 2012

(30) Foreign Application Priority Data
Jul. 9, 2009  (JP) ................................. 2009-162486

(51) Int. Cl.
*G06F 19/00* (2011.01)
*G05B 19/4093* (2006.01)
(52) U.S. Cl.
CPC *G05B 19/40932* (2013.01); *G05B 2219/35188* (2013.01); *G05B 2219/35218* (2013.01); *G05B 2219/36199* (2013.01)
(58) Field of Classification Search
CPC .................................................. G05B 19/4061
USPC ............ 700/97, 103, 171, 172, 173, 178, 183
See application file for complete search history.

(56) References Cited

U.S. PATENT DOCUMENTS 5,363,308 A * 11/1994 Guyder ......................... 700/187
2012/0010741 A1 * 1/2012 Hull et al. ...................... 700/98

FOREIGN PATENT DOCUMENTS

| JP | 7-40071 | 2/1995 |
| JP | 7-299682 | 11/1995 |
| JP | 9-150285 | 6/1997 |
| JP | 2005-327010 | 11/2005 |
| JP | 2006-107131 | 4/2006 |
| WO | 2007/134631 | 11/2007 |

\* cited by examiner

*Primary Examiner* — Kenneth Lo
*Assistant Examiner* — Chad Rapp
(74) *Attorney, Agent, or Firm* — Greenblum & Bernstein, P.L.C.

(57) ABSTRACT

A nesting data generation device generates nesting data for cutting off a part from a work supported by plural support projections. The nesting data generation device includes a nesting data generating unit that generates the nesting data by arranging a geometry of the part on the work. The nesting data generating unit performs, upon arranging the geometry of the part on the work, an avoidance process for avoiding an impediment due to the support projections. According to the nesting data generation device, the part can be prevented from welding on the support projections and the support projections can be prevented from welding upon arranging the geometry on the work by considering positions of the support projections, so that a drop-off and an inclination of the cut part can be prevented.

6 Claims, 6 Drawing Sheets

A-A

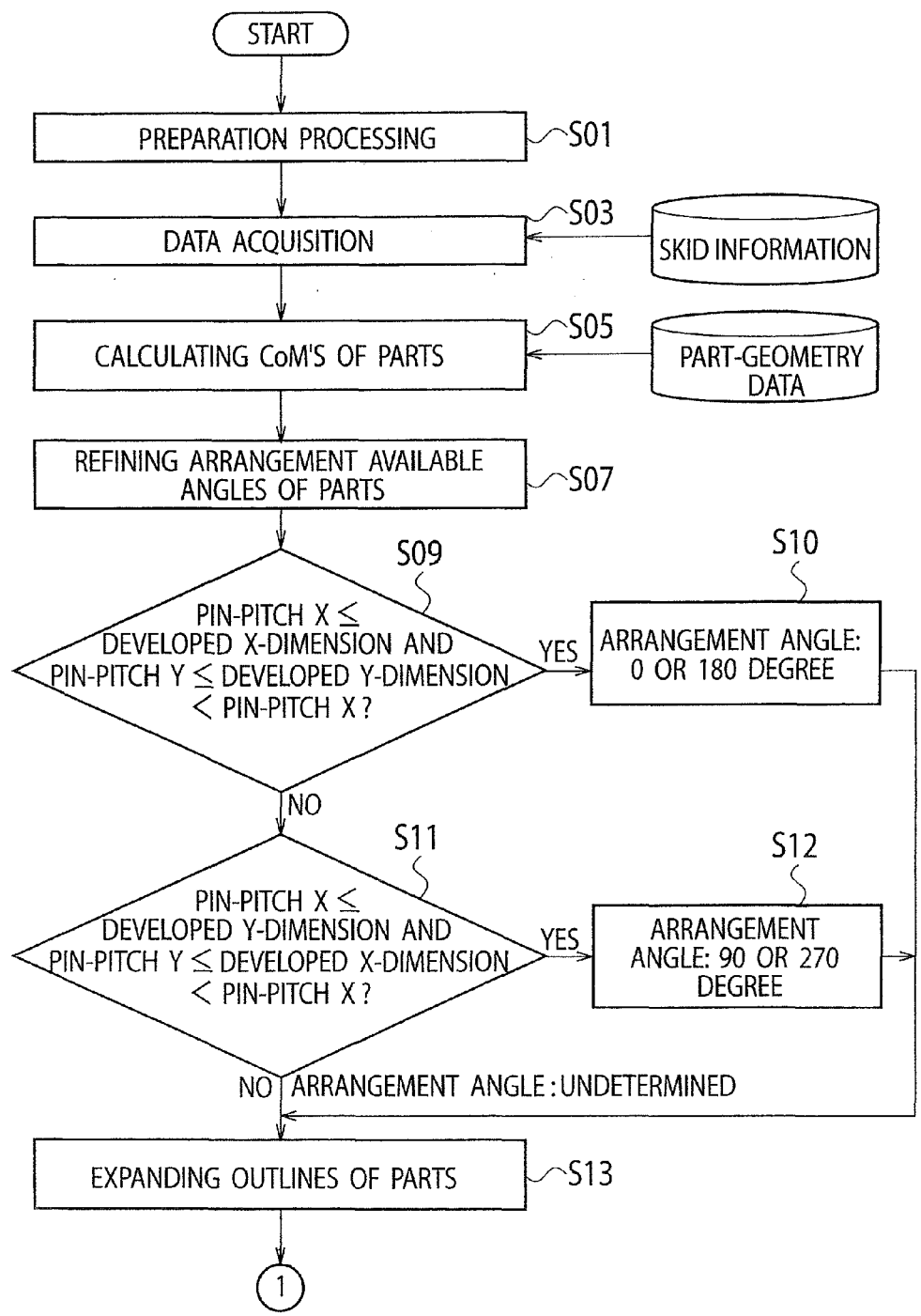

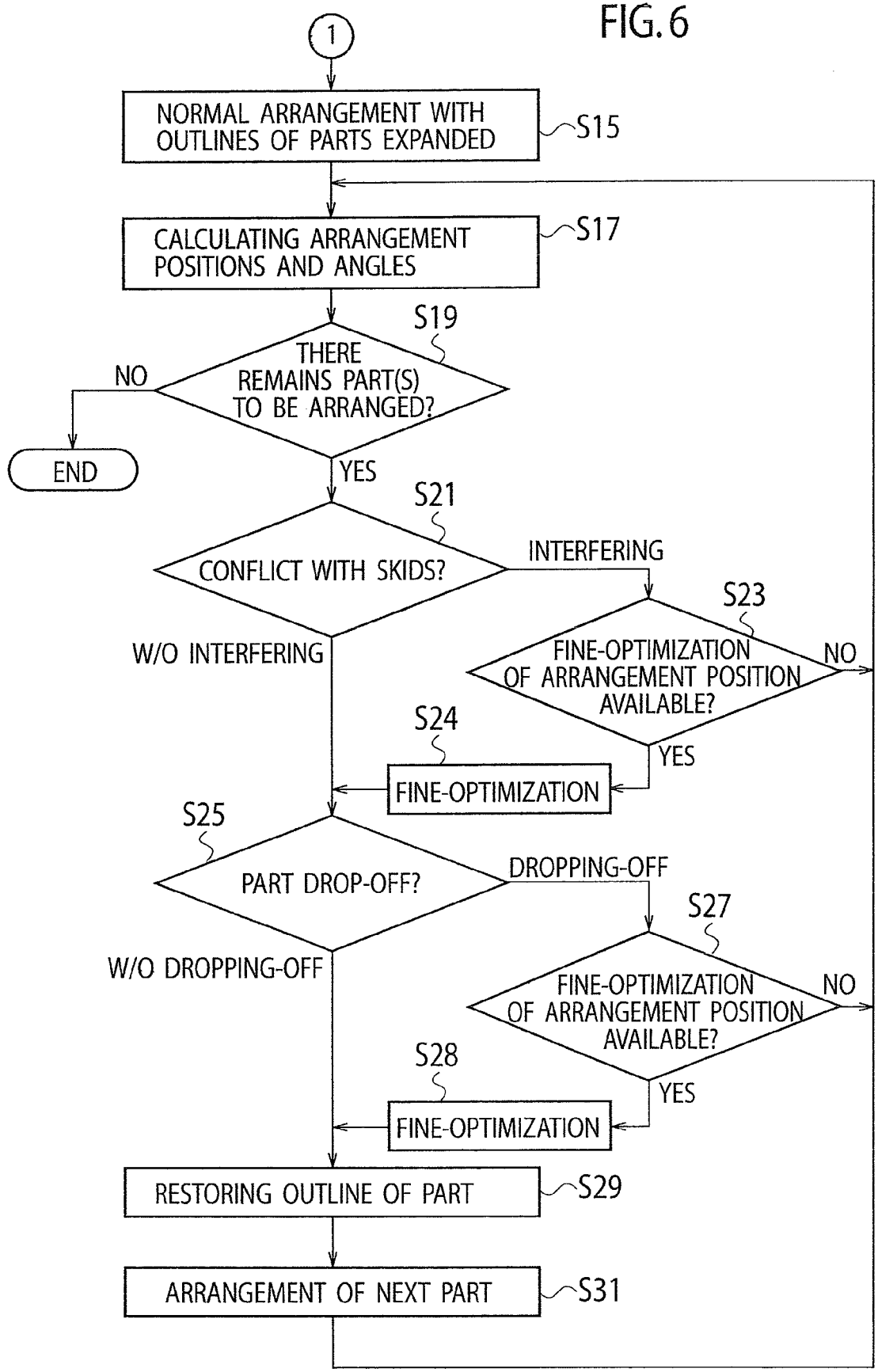

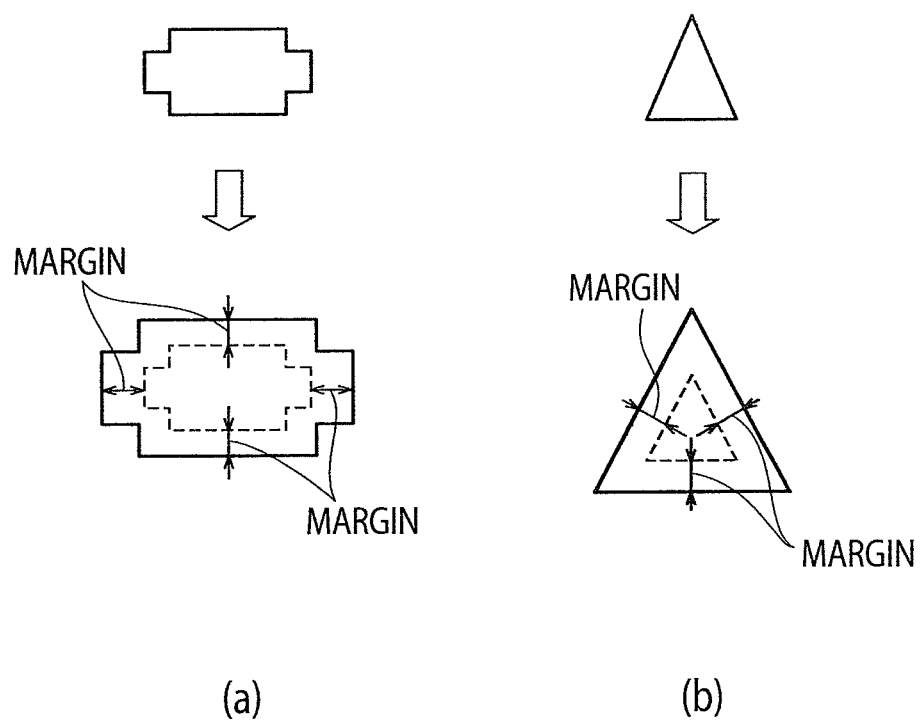

NESTING DATA GENERATION DEVICE AND NESTING DATA GENERATION METHOD

TECHNICAL FIELD

The present invention relates to a nesting data generation device and a nesting data generation method, especially to a nesting data generation device and a nesting data generation method for determining arrangements of parts to be cut in consideration of pitch information of skids.

BACKGROUND ART

Conventionally, upon cutting out plural parts from a work, a nesting process in which cutting outlines of the plural parts are arranged on the work is generally done by a nesting data generation device (e.g. a CAD/CAM machine). Then, NC data is generated based on the nesting process. The NC data is transferred to a processing machine, and then the work is cut.

In a case of a laser processing machine, when nesting developed geometries of plural parts on a work by using a nesting program, the developed shapes are arranged in consideration of yield ratio, but pitch information of skids each having plural support projections of the processing machine is not taken into consideration (Japanese Patent Application Laid-Open No. H09-150285).

SUMMARY OF THE INVENTION

In a conventional nesting data generation device and a conventional nesting data generation method, there occur following problems. For example, since relationships between positions of skids and positions of parts are not taken into consideration, the cut parts are subject to be welded on the skids and the skids are welded due to heat of laser at portions where laser paths conflict with the skids.

In addition, there occurs a problem that the cut parts drop off from the skids or incline depending on arrangement positions between the skids and the parts.

An object of the present invention is to provide nesting data generation device and method that can prevent the cut part(s) from welding on the skids and prevent the skids from welding, so that the cut part (s) can be prevented from dropping off and inclining.

A first aspect of the present invention provides a nesting data generation device for generating nesting data for cutting off a part from a work supported by a plurality of support projections, that includes a nesting data generating unit that generates the nesting data by arranging a geometry of the part on the work, wherein the nesting data generating unit performs, upon arranging the geometry of the part on the work, an avoidance process for avoiding an impediment due to the support projections.

Here, it is preferable that the nesting data generating unit performs, as the avoidance process, a preparation processing for arranging the geometry of the part so as to avoid the part from dropping off from the support projections.

Here, it is preferable that the nesting data generating unit performs, as the avoidance process, a nesting processing for arranging the geometry of the part so as to avoid the support projections from conflicting with a cutting path.

Here, it is preferable that the nesting data generating unit performs, upon arranging the geometry of the part on the work, an outline-expansion process for expanding an outline of the geometry and an arrangement optimizing process for finely-optimizing an arrangement of the geometry within an expanded range of the outline.

Here, it is preferable that the nesting data generating unit performs an NC data generating process for generating NC data based on the generated nesting data.

A second aspect of the present invention provides a nesting data generation method for generating nesting data for cutting off a part from a work supported by a plurality of support projections, that includes a nesting data generating process for arranging a geometry of the part on the work to generate the nesting data, wherein, upon arranging the geometry of the part on the work in the nesting data generating process, an avoidance process for avoiding an impediment due to the support projections is performed.

Here, it is preferable that a preparation processing for arranging the geometry of the part so as to avoid the part from dropping off from the support projections is performed as the avoidance process.

Here, it is preferable that a nesting processing for arranging the geometry of the part so as to avoid the support projections from conflicting with a cutting path is performed as the avoidance process.

According to the present invention, cutting can be done flawlessly and stably because a positional relationship between the support projections and the part is set so as to avoid the cut part from dropping off from the support projection, and a conflict between a laser head and the cut part can be prevented, and a part carry-out device can operates stably.

In addition, according to the present invention, since a heat-cutting path(s) by a laser processing machine or the like doesn't conflict with the support projections, the cut part(s) can be avoided from welding on the support projections. In addition, welding of the support projections due to a laser can be avoided.

BRIEF DESCRIPTION OF THE DRAWINGS

FIG. 5 is a flowchart for explaining nesting process by the controller.

FIG. 6 is the flowchart for explaining the nesting process by the controller.

FIGS. 7 (*a*) and (*b*) are explanatory diagrams for explaining a margin.

DESCRIPTION OF EMBODIMENT(S)

Hereinafter, an embodiment of the present invention will be explained with reference to the drawings.

Figure 1:
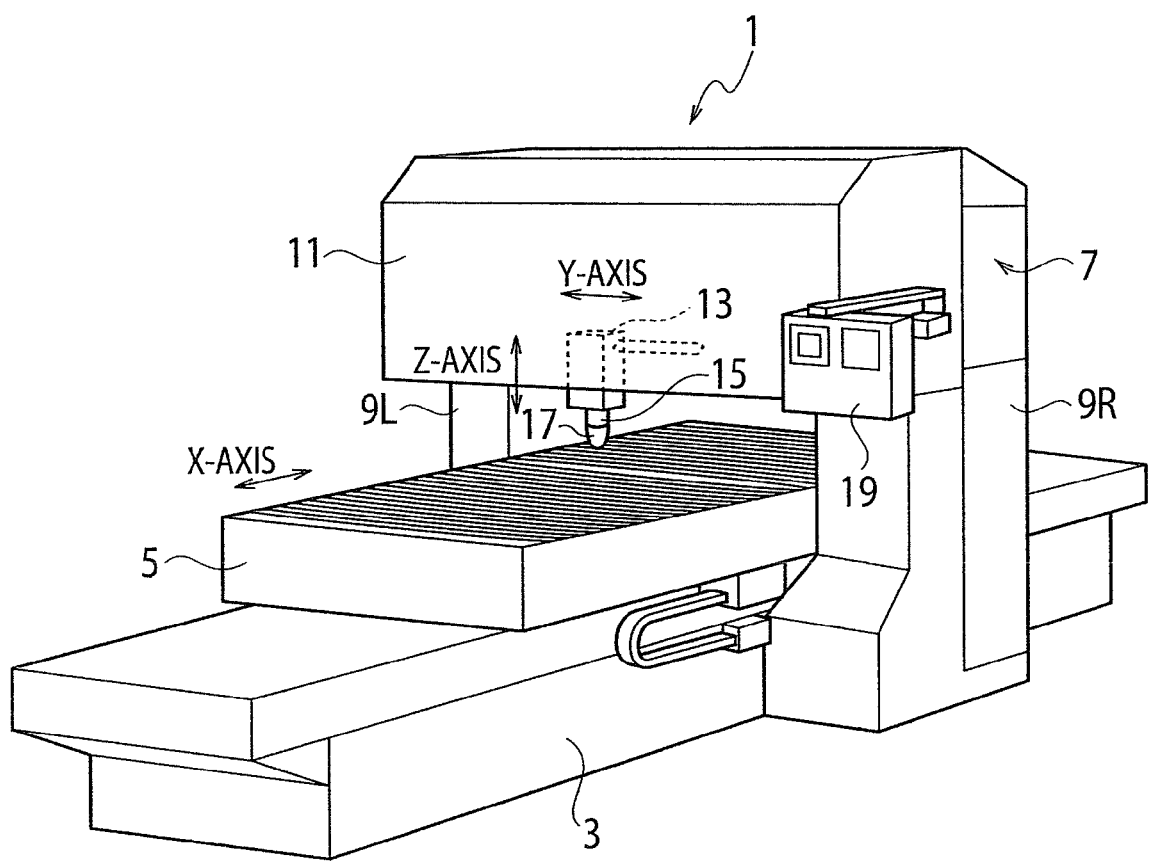
FIG. 1 is a schematic view for explaining an overview of a laser working machine.

As shown in FIG. 1, in a laser working machine 1, a gate-shaped frame 7 is stood near a center portion of a bed 3 extending in an X-axis direction (front-back direction). An upper frame 11 that constitutes a portion of the frame 7 is supported by right and left lower frames 9R and 9L, and is bridged over the bed 3. The upper frame 11 is provided with a Y-axis carriage 13 movable in a Y-axis direction (right-left direction). The Y-axis carriage 13 is provided with a Z-axis carriage 15 movable in a Z-axis (up-down direction). A head 17 is provided at a lowermost portion of the Z-axis carriage 15.

According to the above configuration, the head 17 can be moved at an arbitrary position along the X-axis direction and the Y-axis direction, and then its position is fixed. Note that the Y-axis carriage 13 and the Z-axis carriage 15 are driven by a drive unit (not shown) and an NC control device 19.

The bed 3 is provided with a worktable 5 movable in the X-axis direction. The bed 3 is provided with an X-axis guide extending in the X-axis direction.

According to the above configuration, the worktable 5 can be moved in the X-direction with guided by the X-axis guide, and then its position is fixed.

Figure 2:
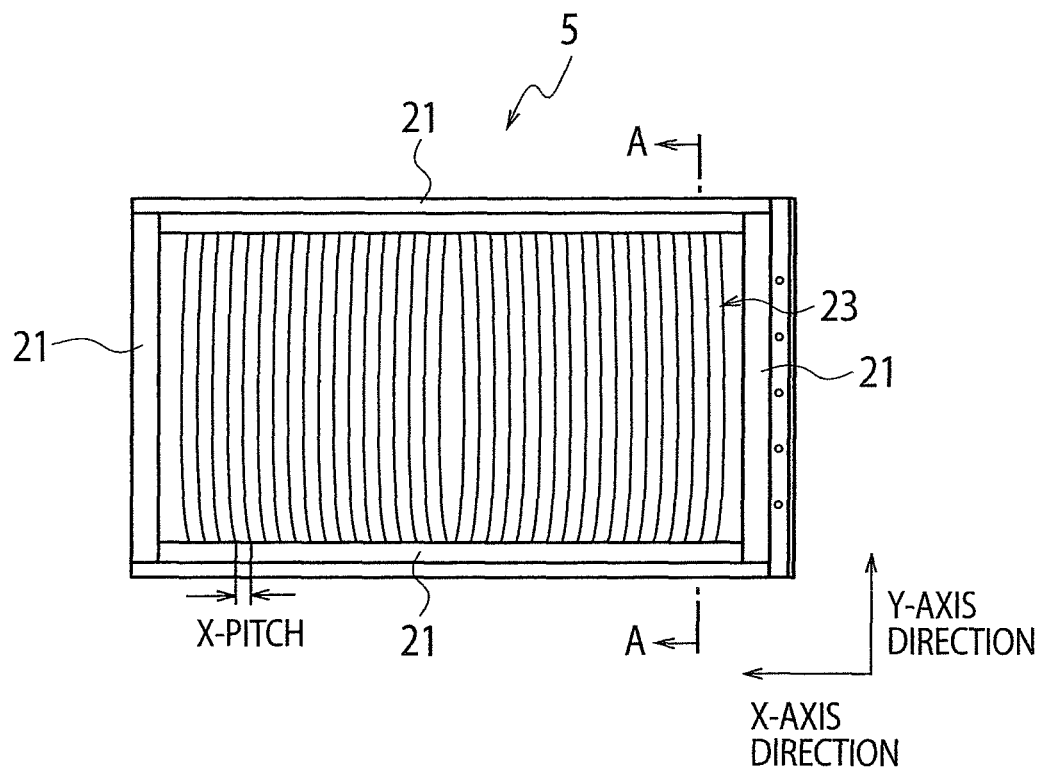
FIG. 2 is a plan view for explaining skids.
Figure 3:
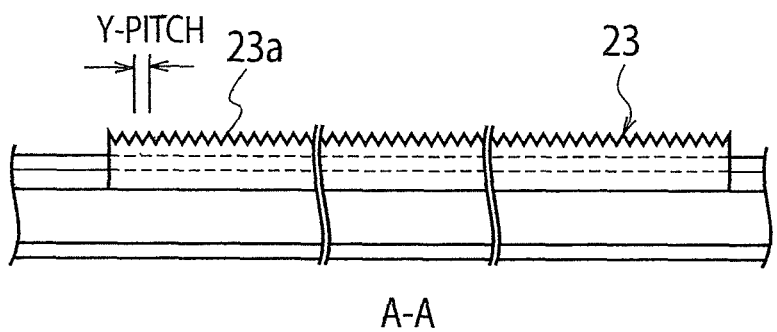
FIG. 3 is a cross-sectional view taken along a line A-A shown in FIG. 2.

As shown in FIG. 2 and FIG. 3, plural long plate members 23 are attached parallel to right and left sides of a housing of the worktable 5 at intervals in the X-axis direction. Each distance of the long plate members 23 is set to an X-pitch in the present embodiment (see FIG. 2). On each of the long plate members 23, plural support pins (support projections) 23a each has a distal end for supporting a work horizontally are formed at intervals. Each distance of the support pins 23a is set to a Y-pitch in the present embodiment (see FIG. 3). Therefore, a whole undersurface of the work is supported evenly by the many distal ends.

In addition, vertical positions of upper ends of the support pins 23a are set at a slightly lower position than an upper plane of an outer frame 21 (the housing) of the worktable 5. Namely, the support pins 23a are provided so that a position of the work supported by the upper ends of the support pins 23a is located within the housing.

When cutting off parts from the work supported by the plural support pins 23a, desired-shaped parts can be cut off from the work by controlling the Y-axis carriage 13 provided with the head 17 and the worktable 5 movable in the X-axis direction. Note that a distance between the head 17 and the work can be controlled by adjusting a height level of the Z-axis carriage 15.

Figure 4:
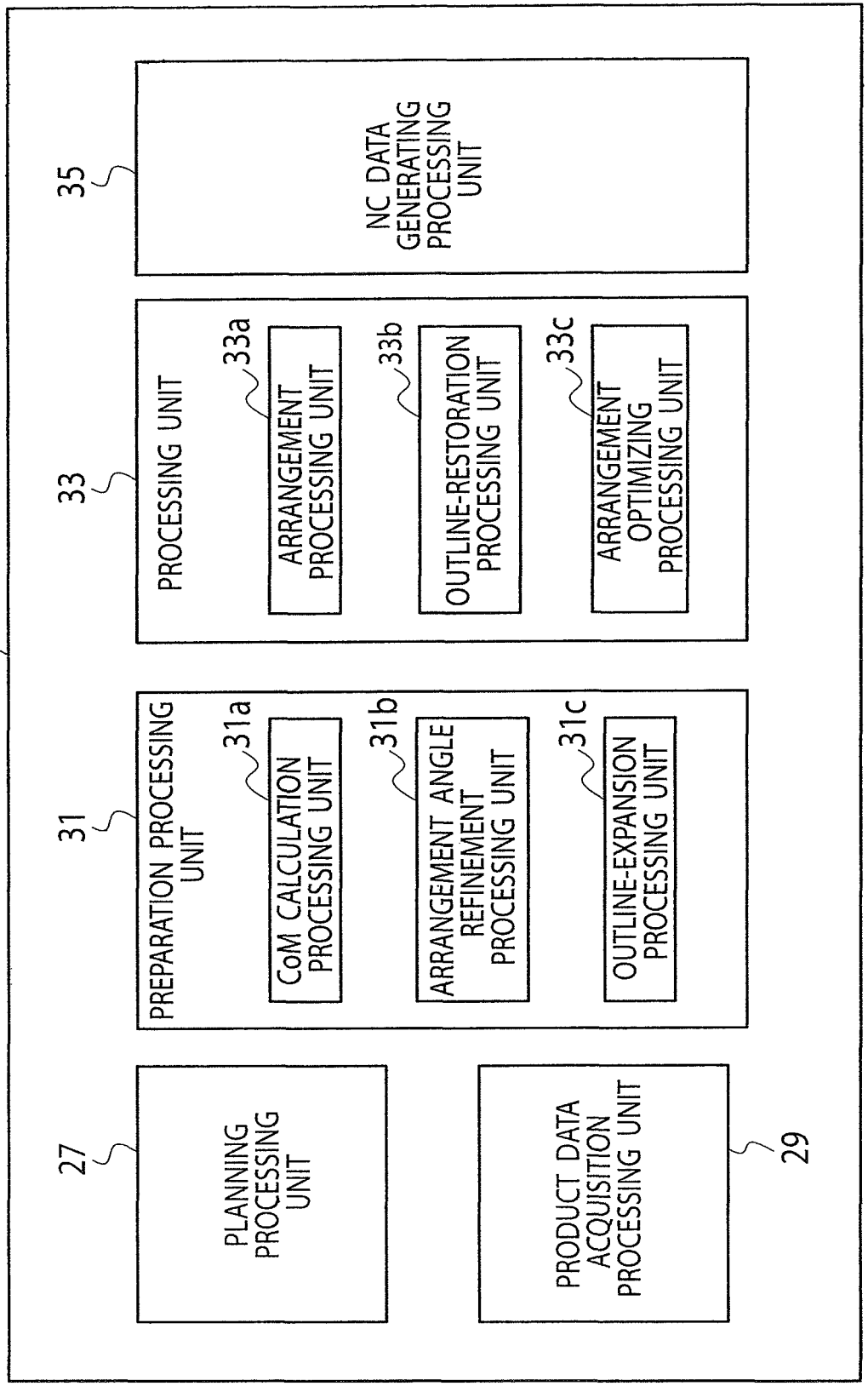
FIG. 4 is a block diagram for explaining an overview of a controller.

As shown in FIG. 4, a nesting data generation device is a computer that is constituted of a computer main unit, a display device, a keyboard, a mouse and so on (not shown), and includes a data generating unit 25.

The data generating unit 25 includes a planning processing unit 27, a product data acquisition processing unit 29, a preparation processing unit 31, a nesting processing unit 33, and an NC data generating processing unit 35. The preparation processing unit 31 includes a CoM (center of mass) calculation processing unit 31a, an arrangement angle refinement unit 31b, and an outline-expansion processing unit 31c. The nesting processing unit 33 includes an arrangement processing unit 33a, an outline-restoration processing unit 33b, and an arrangement optimizing processing unit 33c.

A function of the data generating unit 25 is a nesting system that generates NC data for nesting and laser-cutting the parts from the work efficiently based on a production plan including thickness, material, production volume and delivery deadline of sheet metal products to be produced.

Although the present system presupposes a working machine that uses a skid table, it may be applied to a working machine that has a multi-pin type table structure (a work is supported by aligned plural pins) and serves a similar function.

In addition, an avoidance process for avoiding impediments due to the support pins 23a is also performed in the present system. Namely, in the avoidance process, cut positions of the parts are arranged at positions where the parts will not drop off from the support pins 23a after the parts will be cut off. Further, in the avoidance process, cutting paths for heat-cutting by a laser processing machine or the like are set so as not to conflict with the support pins 23a.

The planning processing unit 27 performs a processing of generating a planning for nesting developed shapes of products that were ordered and to be produced on the work.

The product data acquisition processing unit 29 performs a processing of acquiring product data such as developed shapes of the parts generated by the planning processing unit 27 and so on.

The preparation processing unit 31 will be explained. The product data sequentially acquired according to the planning are processed as shown below.

(1) A CoM of the part of the product is calculated in order to get a position for enabling a point-support by the distal ends of the plural support pins 23a.

(2) In a case where, because of a relationship between a X-dimension and a Y-dimension of a part geometry and the X-pitch and the Y-pitch of support points of the support pins 23a, the part cannot be supported along a direction due to a smaller dimension of the part than the interval of the support pins 23a but can be supported along another direction due to a larger dimension of the part than the interval of the support pins 23a, an arrangement direction of the part geometry is preliminarily determined.

(3) A relatively, expanded outline of the part is preliminarily generated and its data is stored with correlated with the part in order to enable an arrangement position of the part to be slightly moved after a temporary arrangement.

In the above processing, the CoM calculation processing unit 31a calculates the CoM position of the part based on the shape of the part. The arrangement angle refinement unit 31b determines the arrangement position, a direction of the part geometry and so on with reference to the CoM position of the part and the X-pitch and the Y-pitch relative to a reference position.

The outline-expansion processing unit 31c performs a processing of expanding an outline of the part with respect to the part whose arrangement position and direction have been determined (see FIG. 7 (a) and FIG. 7(b)). For example, the outline of the part is offset outward by a given amount to get a margin. The offset amount is an amount within a range that enables a later fine-optimization of the part geometry.

The nesting processing unit 33 will be explained. The nesting processing unit 33 temporally arranges the above-mentioned expanded (margined) outlines effectively on the work according to a predetermined arrangement direction. In this case, the temporary arrangement is done by use of a common method known as a general nesting method.

The expanded outlines are restored after the temporary arrangement. Here, if it is judged that a laser beam will conflict with the support pins 23a (irradiate on the support pins 23a) upon cutting off a part or a part will drop off after cutting off the part due to a positional relationship between the CoM and the support ins 23a, the arrangement position of the part is changed within an expanded range (margin) without affecting other surrounding parts.

Specifically, the outline of the part expanded by the outline-expansion processing unit 31c is temporally arranged by the above-mentioned arrangement processing unit 33a.

Next, the outline-restoration processing unit 33b restores the expanded outline of the part to its original outline.

Subsequently, the arrangement optimizing processing unit 33c judges whether or not the arrangement of the part is appropriate with reference to the cutting paths, the CoM position of the part, and the X-pitch and the Y-pitch relative to the reference position. If it is not appropriate, the arrangement optimizing processing unit 33c finely-optimizes the arrangement position and/or direction within the expanded range (margin).

The NC data generating processing unit 35 generates NC data for cutting all parts arranged on the work determined based on the positions, angles, and outline information of the parts whose arrangements have been determined. The NC data is transmitted to the NC control device 19, and then laser cutting is done with numerically controlled based on the NC data.

Operations of the nesting data generation device 25 will be explained With reference to a flowchart shown in FIG. 5 and FIG. 6.

First, the preparation processing unit 31 achieves the preparation processing (step S01).

Next, the preparation processing unit 31 acquires parameters (step S03). Specifically, the preparation processing unit 31 acquires the parameters from memory that stores skid information of the processing machine.

Main contents of the skid information (the parameters) are the pitches of the support pins 23a in the X-direction and the Y-direction. In addition, the reference position of the X-pitch and the Y-pitch is also loaded. Therefore, the relative positional relationship between the plural support pins 23a and the work is obtained.

Subsequently, the CoM calculation processing unit 31a calculates the CoM positions of the parts (step S05). Namely, the CoM calculation processing unit 31a calculates the CoM positions (CoM position on a planer geometry: indicated with X and Y coordinate values) of the parts based on geometry data of the parts (shapes of the parts or the like).

Subsequently, the arrangement angle refinement processing unit 31b refines arrangement available angles of the parts (step S07). Namely, with respect to a part(s) whose arrangement angle can be limited, its arrangement angle is preliminarily limited.

Subsequently, the arrangement angle refinement processing unit 31b judges whether or not two conditions "pin-pitch X≤developed X-dimension" and "pin-pitch Y≤developed Y-dimension<pin-pitch X" are concurrently satisfied (step S09). If the two conditions are concurrently satisfied, the arrangement angle is set to 0° or 180° (step S10), and then the process flow proceeds to step S13.

On the other hand, if the above-mentioned conditions are not satisfied, the arrangement angle refinement processing unit 31b judges whether or not two conditions "pin-pitch X≤developed Y-dimension" and "pin-pitch Y≤developed Y-dimension<pin-pitch X" are concurrently satisfied (step S11). If the conditions are satisfied, the arrangement angle is set to 90° or 270° (step S12), and then the process flow proceeds to step S13. On the other hand, if the conditions are not satisfied, the process flow proceeds to step S13 with the arrangement angle undetermined.

Subsequently, the outline-expansion processing unit 31c sets the margins to the outlines of the parts (step S13). Namely, the outline-expansion processing unit 31c enlarges (offsets outward) the outlines of the parts to set the margins for allowing a slight movement/rotation after temporary arrangements.

Subsequently, the arrangement processing unit 33a the parts with their outlines of the parts enlarged temporally arranges on the work (step S15). As explained above, the temporary arrangement is done by use of a common method known as a general nesting method.

Subsequently, the nesting processing unit 33 calculates the arrangement position and the arrangement angle (step S17). Note that, in a case where the arrangement angle has been determined already in the above-explained steps S07, S09 and S11, the arrangement angle is acquired and then used. In addition, in a case where the arrangement angle has not been determined yet, the arrangement angle may be changed gradually to determine the arrangement angle that avoids the cut part from dropping off.

Subsequently, the arrangement processing unit 33a judges whether or not there remains the part(s) to be arranged (step S19). If no part to be arranged remains, the process flow is terminated.

If there remains part(s) to be arranged, the arrangement processing unit 33a whether or not a conflict with the plural support pins 23a (skids) will occur (step S21). If it is judged that a conflict will occur, the arrangement optimizing processing unit 33c judges whether or not a fine-optimization of the arrangement position is available (step S23). If it is judged that a fine-optimization is unavailable, the process flow is returned to step S17. On the other hand, if it is judged that a fine-optimization is available, the arrangement optimizing processing unit 33c finely-optimizes the arrangement position (step S24).

In addition, if it is judged a conflict won't occur in step S21 or if the process in step S24 has been done, the arrangement processing unit 33a judges whether or not a drop-off will occur (step S25). For example, in a case where the CoM of the part locates in an inside of at least three support pins 23a, it may be judged that a drop-off won't occur. Otherwise, in a case where the CoM locates in an outside of the support pins 23a that support the cut part, it may be judged that a drop-off (or an inclination) will occur.

If it is judged that a drop-off will occur in step S25, the arrangement optimizing processing unit 33c judges whether or not a fine-optimization of the arrangement position is available (step S27). If it is judged that a fine-optimization is unavailable, the process flow is returned to step S17. On the other hand, if it is judged that a fine-optimization is available, the arrangement optimizing processing unit 33c finely-optimizes the arrangement position (step S28).

In addition, if it is judged a drop-off won't occur in step S25 or if the process in step S28 has been done, the outline-restoration processing unit 33b restores the outline of the part (step S29). Note that, in steps S24 and S28, the above-explained fine-optimization can be done by rotating/moving the part in a planar view.

Subsequently, the nesting processing unit 33 returns the process flow to step S17 in order to arrange the next part (step S31).

The fine-optimization insteps S24 and S28 is the avoidance process for avoiding impediments (conflict, drop-off) due to the support projections 23a. Note that the above-explained expansion processing and the above-explained fine-optimization can be done for each one part, but the fine-optimization may be done for all the parts to be arranged on the work at one time and then the fine-optimization may be done. In addition, in a case where no fine-optimization is needed for the parts, the expansion process may never be planed from start. In addition, in the fine-optimization in step S24 and S28, it may be allowed that the margins overlap each other.

The present invention is not limited to the above-explained embodiments, and may be achieved with other embodiments by modifying appropriately.

What is claimed is:

1. A nesting data generation device that generates nesting data for cutting off a part from a work supported by a plurality of support projections, the device comprising:
   a nesting data generating unit that generates the nesting data by arranging a geometry of the part on the work,
   wherein the nesting data generating unit is configured to perform, upon arranging the geometry of the part on the work, an avoidance process for avoiding an impediment to the cutting off of the part from the work based on a positional relationship between the geometry of the part and an X-pitch and a Y-pitch of the plurality of support projections on which the work is supported, wherein the nesting data generating unit is configured to perform, as the avoidance process, a preparation processing for arranging the geometry of the part so as to avoid the part from dropping off from the plurality of support projections in a preparation processing unit, and wherein the preparation processing unit includes a center of mass (CoM) calculating processing unit that calculates a CoM based on the geometry of the part, an arrangement angle refinement processing unit that determines an arrangement of the part on the plurality of support projections based on the CoM of the part, and an outline-expansion processing unit that expands an outline of the geometry of the part with respect to the arrangement of the part on the plurality of support projections.

2. The nesting data generation device according to claim 1, wherein the nesting data generating unit is configured to perform, as the avoidance process, a nesting processing for arranging the geometry of the part so as to avoid the plurality of support projections from conflicting with a cutting path in a nesting processing unit.

3. The nesting data generation device according to claim 1, wherein the nesting data generating unit is configured to perform, upon arranging the geometry of the part on the work, an outline-expansion process for expanding an outline of the geometry of the part and an arrangement optimizing process for finely-optimizing an arrangement of the geometry of the part within an expanded range of the outline in an outline-expansion processing unit.

4. The nesting data generation device according to claim 1, wherein the nesting data generating unit is configured to perform an NC data generating process for generating NC data based on the generated nesting data.

5. A nesting data generation method for generating nesting data for cutting off a part from a work supported by a plurality of support projections, the method comprising:

a nesting data generating process for arranging a geometry of the part on the work to generate the nesting data, wherein, upon arranging the geometry of the part on the work in the nesting data generating process, performing an avoidance process for avoiding an impediment to the cutting off of the part from the work based on a positional relationship between the geometry of the part and an X-pitch and a Y-pitch of the plurality of support projections on which the work is supported wherein a preparation processing for arranging the geometry of the part so as to avoid the part from dropping off from the support projections is performed as the avoidance process, and wherein the preparation processing includes a center of mass (CoM) calculating processing that calculates a CoM based on the geometry of the part, an arrangement angle refinement processing that determines an arrangement of the part on the plurality of support projections based on the CoM of the part, and an outline-expansion processing that expands an outline of the geometry of the part with respect to the arrangement of the part on the plurality of support projections.

6. The nesting data generation method according to claim 5, wherein a nesting processing for arranging the geometry of the part so as to avoid the support projections from conflicting with a cutting path is performed as the avoidance process.

* * * * *